(12) United States Patent
Kim et al.

(10) Patent No.: US 12,424,631 B2
(45) Date of Patent: Sep. 23, 2025

(54) BINDER FOR LITHIUM-SULFUR SECONDARY BATTERY AND LITHIUM-SULFUR SECONDARY BATTERY INCLUDING SAME

(71) Applicant: LG CHEM, LTD., Seoul (KR)

(72) Inventors: Taek Gyoung Kim, Daejeon (KR); Kyung Oh Kim, Daejeon (KR); Doo Kyung Yang, Daejeon (KR); Sung Soo Yoon, Daejeon (KR); Jeongae Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 977 days.

(21) Appl. No.: 16/954,387

(22) PCT Filed: Apr. 11, 2019

(86) PCT No.: PCT/KR2019/004385
§ 371 (c)(1),
(2) Date: Jun. 16, 2020

(87) PCT Pub. No.: WO2019/212162
PCT Pub. Date: Nov. 7, 2019

(65) Prior Publication Data
US 2021/0083292 A1  Mar. 18, 2021

(30) Foreign Application Priority Data

May 3, 2018 (KR) .................. 10-2018-0051171
May 3, 2018 (KR) .................. 10-2018-0051175

(51) Int. Cl.
| | |
|---|---|
| *H01M 4/62* | (2006.01) |
| *H01M 4/02* | (2006.01) |
| *H01M 4/38* | (2006.01) |
| *H01M 10/0525* | (2010.01) |

(52) U.S. Cl.
CPC .......... *H01M 4/622* (2013.01); *H01M 4/382* (2013.01); *H01M 10/0525* (2013.01); *H01M 2004/028* (2013.01)

(58) Field of Classification Search
CPC .. H01M 4/622; H01M 4/382; H01M 10/0525; H01M 2004/028; H01M 4/0404; H01M 4/13; H01M 4/136; H01M 4/62; H01M 10/052; Y02E 60/10; C08F 220/06; C08F 220/20; C08L 33/02; C08L 33/14
See application file for complete search history.

(56) References Cited

U.S. PATENT DOCUMENTS

| | | |
|---|---|---|
| 4,435,539 A | 3/1984 | Witiak |
| 2004/0082241 A1 | 4/2004 | Rodrigues |
| 2007/0091544 A1 | 4/2007 | Terada et al. |
| 2012/0231332 A1* | 9/2012 | Kose ............... H01M 4/623 |
| | | 977/773 |
| 2013/0260241 A1* | 10/2013 | Sone ............... H01M 10/0562 |
| | | 252/182.1 |
| 2015/0243994 A1 | 8/2015 | Chu et al. |
| 2017/0062828 A1* | 3/2017 | Sonobe ............ H01M 10/0525 |
| 2017/0352886 A1* | 12/2017 | Matsuzaki ........ H01M 10/0525 |
| 2018/0114988 A1 | 4/2018 | Yoon et al. |
| 2019/0020035 A1 | 1/2019 | Hanasaki et al. |
| 2020/0161658 A1 | 5/2020 | Yoon et al. |

FOREIGN PATENT DOCUMENTS

| | | |
|---|---|---|
| CN | 106463732 A | 2/2017 |
| CN | 107641170 A | 1/2018 |
| EP | 3 512 014 A1 | 7/2019 |
| JP | 4432906 B2 | 3/2010 |
| JP | 2010-140841 A | 6/2010 |
| JP | 2013-69672 A | 4/2013 |
| JP | 2014-29580 A | 2/2014 |
| JP | 2014-160651 A | 9/2014 |
| JP | WO 2017/073589 A1 | 5/2017 |
| JP | 6150031 B1 | 6/2017 |
| KR | 10-2002-0011563 A | 2/2002 |
| KR | 10-2016-0142823 A | 12/2016 |
| KR | 10-2016-0149042 A | 12/2016 |
| KR | 10-2017-0050078 A | 5/2017 |
| KR | 10-2018-0033665 A | 4/2018 |
| KR | 10-2018-0033677 A | 4/2018 |
| WO | WO 2015/186363 A1 | 12/2015 |
| WO | WO 2017/122540 A1 | 7/2017 |
| WO | WO 2018/056782 A1 | 3/2018 |

OTHER PUBLICATIONS

Extended European Search Report for European Application No. 19796453.9, dated Feb. 1, 2021.

(Continued)

*Primary Examiner* — Nathanael T Zemui
(74) *Attorney, Agent, or Firm* — Birch, Stewart, Kolasch & Birch, LLP

(57) ABSTRACT

A binder for a lithium-sulfur secondary battery and a lithium-sulfur secondary battery including the same. The binder includes a copolymer having a first polymerization unit derived from a first monomer and a second polymerization unit derived from a second monomer. The first monomer is alkyl acrylate having at least one functional group or alkyl methacrylate having at least one functional group. The second monomer is acrylic acid or methacrylic acid. The at least one functional group in the first monomer is a functional group having a single or repeated structure of a hydroxy group substituted or unsubstituted with alkyl having 1 to 4 carbon atoms, a thiol group substituted or unsubstituted with alkyl having 1 to 4 carbon atoms, or an amino group substituted or unsubstituted with alkyl having 1 to 4 carbon atoms. The second polymerization unit may have a lithiated form.

8 Claims, No Drawings

(56) References Cited

OTHER PUBLICATIONS

International Search Report for PCT/KR2019/004385 mailed on Jul. 16, 2019.

\* cited by examiner

BINDER FOR LITHIUM-SULFUR SECONDARY BATTERY AND LITHIUM-SULFUR SECONDARY BATTERY INCLUDING SAME

TECHNICAL FIELD

This application claims the benefits of priorities based on Korean Patent Application Nos. 10-2018-0051171 and 10-2018-0051175, filed on May 3, 2018, the entire contents of which are incorporated herein by reference.

The present invention relates to a binder for a lithium-sulfur secondary battery and a lithium-sulfur secondary battery comprising the same.

BACKGROUND ART

As the application area of secondary battery is expanding to the electric vehicles (EV) and the energy storage system (ESS), the lithium-ion secondary battery with relatively low weight-to-energy storage density (~250 Wh/kg) is facing limitations in application to such products. Alternatively, since the lithium-sulfur secondary battery can achieve the theoretically high weight-to-energy storage density (~2,600 Wh/kg), it is attracting attention as a next-generation secondary battery technology.

The lithium-sulfur secondary battery means a battery system using a sulfur-based material having an S—S bond (sulfur-sulfur bond) as a positive electrode active material and using lithium metal as a negative electrode active material. Sulfur, which is the main material of the positive electrode active material has advantages that it is very rich in resources all over the world, is not toxic, and has a low atomic weight.

In the lithium-sulfur secondary battery, when discharging the battery, lithium which is a negative electrode active material is oxidized while releasing electron and thus ionizing, and the sulfur-based material which is a positive electrode active material is reduced while accepting the electron. In that case, the oxidation reaction of lithium is a process by which lithium metal releases electron and is converted to lithium cation form. In addition, the reduction reaction of sulfur is a process by which the S—S bond accepts two electrons and is converted to a sulfur anion form. The lithium cation produced by the oxidation reaction of lithium is transferred to the positive electrode through the electrolyte and is combined with the sulfur anion generated by the reduction reaction of sulfur to form a salt. Specifically, sulfur before discharging has a cyclic $S_8$ structure, which is converted to lithium polysulfide ($LiS_x$) by the reduction reaction. When the lithium polysulfide is completely reduced, lithium sulfide ($Li_2S$) is produced.

Although the lithium-sulfur secondary battery has an advantage of high energy storage density, there are many problems in actual application. Specifically, there may be a problem of the instability of lithium metal used as the negative electrode, a problem of the low conductivity of the positive electrode, a problem of the sublimation of the sulfur-based material in preparing the electrode, and a problem of the loss of the sulfur-based material in the repetitive charging/discharging process. In particular, the problem of the leaching of sulfur-based materials in the positive electrode, which is caused when lithium polysulfide produced from positive electrode during the discharging migrates to the lithium metal surface of the negative electrode during the charging and is reduced, is a problem that must be overcome in order to commercialize the lithium-sulfur secondary battery.

There have been various attempts in the art to inhibit the leaching of such sulfur-based materials. Examples thereof may include a method of adding an additive having a property of adsorbing sulfur to the positive electrode mixture, a method of treating the surface of sulfur with a substance including an hydroxide of the coating element, an oxyhydroxide of the coating element, an oxycarbonate of the coating element or a hydroxycarbonate of the coating element, and a method of making the carbon materials to be nanostructures and restricting the lithium polysulfides thereto.

However, in the case of adding the additive, there is a problem of conductive deterioration and a risk of side reaction. In the case of the surface treatment technique, there are disadvantages that the active material is lost during the treatment process and it is not preferable from the viewpoint of cost. In the case of the carbon nanostructures, there is a disadvantage that the preparing process is complicated.

In addition, these conventional techniques have a problem that the capacity and lifetime characteristics of the lithium-sulfur secondary battery cannot be greatly improved.

PRIOR ART DOCUMENT

Patent Document (Patent Document 1) Korean Patent Laid-open Publication No. 10-2002-0011563.

DISCLOSURE

Technical Problem

In order to solve the above problems, the present invention provides a binder for a lithium-sulfur secondary battery capable of improving the adhesive force at the electrode and the performance of the battery by using a copolymer formed by polymerizing an acrylic acid or methacrylic acid monomer and a monomer containing a specific functional group capable of improving water solubility.

Technical Solution

According to a first aspect of the present invention, the present invention provides a binder for a lithium-sulfur secondary battery comprising a copolymer having including a first polymerization unit derived from a first monomer and a second polymerization unit derived from a second monomer, wherein the first monomer is alkyl acrylate having at least one functional group or alkyl methacrylate having at least one functional group, the second monomer is acrylic acid or methacrylic acid, and the at least one functional group in the first monomer is a functional group having a single or repeated structure of a hydroxy group substituted or unsubstituted with alkyl having 1 to 4 carbon atoms, a thiol group substituted or unsubstituted with alkyl having 1 to 4 carbon atoms, or an amino group substituted or unsubstituted with alkyl having 1 to 4 carbon atoms.

In one embodiment of the present invention, the second polymerization unit has a lithiated form.

In one embodiment of the present invention, the at least one functional group in the first monomer is selected from the group consisting of a hydroxy group, a thiol group, an amino group, a methoxy group, an ethoxy group, a propoxy group, a butoxy group, a methylthio group, an ethylthio group, a propylthio group, a butylthio group, a methylamino group, a dimethylamino group, an ethylamino group, a diethylamino group, a propylamino group, a dipropylamino group, a butylamino group, a dibutylamino group, a methoxymethoxy group, a 2-ethoxyethoxy group, a 3-propoxypropoxy group and a 4-butoxybutoxy group.

In one embodiment of the present invention, the alkyl on the alkyl acrylate or alkyl methacrylate has 1 to 6 carbon atoms.

In one embodiment of the present invention, the copolymer comprises 10% by weight to 50% by weight of the first polymerization unit.

In one embodiment of the present invention, the copolymer has a glass transition temperature of 30° C. to 120° C.

In one embodiment of the present invention, the copolymer has a solubility in water of 10% by weight to 70% by weight and a solubility in an ether-based solvent of 0.001% by weight to 1% by weight.

In one embodiment of the present invention, the copolymer has a weight average molecular weight of 50,000 to 5,000,000.

In one embodiment of the present invention, the binder is in the form of particles having a particle diameter of 0.1 nm to 10 nm.

According to a second aspect of the present invention, the present invention provides a composition for preparing a positive electrode active material layer of a lithium-sulfur secondary battery comprising the above-described binder, a positive electrode active material, and an electrically conductive material.

In one embodiment of the present invention, the composition comprises 0.001 parts by weight to 10 parts by weight of the binder; 25 parts by weight to 95 parts by weight of the positive electrode active material; and 2 parts by weight to 70 parts by weight of an electrically conductive material, based on 100 parts by weight of a solid content in the composition.

In one embodiment of the present invention, the composition further comprises 0.1 parts by weight to 20 parts by weight of a dispersing agent for the electrically conductive material, based on 100 parts by weight of the solid content in the composition.

According to a third aspect of the present invention, the present invention provides a positive electrode for a lithium-sulfur secondary battery comprising a current collector, and a positive electrode active material layer comprising the above composition on the current collector.

According to a fourth aspect of the present invention, the present invention provides a lithium-sulfur secondary battery comprising the above-described positive electrode.

Advantageous Effects

The binder for the lithium-sulfur secondary battery according to the present invention has excellent adhesion performance through strong interaction with a positive electrode active material and an electrically conductive material during the preparation of the positive electrode. In addition, the binder can assist in uniform dispersion of carbon used as an electrically conductive material and in formation of a secondary structure thereof during the preparation of the positive electrode, and can maintain a high adsorption force on the active material in the positive electrode prepared using it.

Since the binder has a low solubility with respect to an electrolyte comprising an ether-based mixture, the positive electrode prepared using the binder can have high stability.

Since the binder is a water-soluble polymer and it can be efficiently dried even at a low drying temperature and a short drying time in the drying step during the preparation of the electrode, it is possible to solve the problem of lowering the electrode capacity due to the sublimation of the sulfur-based material that may occur during the preparation of the electrode.

Therefore, the lithium-sulfur secondary battery manufactured using the binder according to the present invention has excellent cycle characteristics.

BEST MODE

The embodiments provided in accordance with the present invention can be all achieved by the following description. It is to be understood that the following description is of a preferred embodiment of the present invention and that the present invention is not necessarily limited thereto.

The term of a compound containing "(meth)" as used herein means that the "meth" is optionally described. For example, (meth)acrylic acid means methacrylic acid or acrylic acid, and (meth)acrylate means methacrylate or acrylate.

The term "solubility" as used herein means a solubility measured by the following solubility measurement method, and the solubility is a solubility measured at room temperature (25° C.), even if there is no specific mention of the temperature below.

Binder

The present invention provides a binder for a lithium-sulfur secondary battery capable of forming a stable positive electrode with improved adhesive force between the binder and a positive electrode active material and a current collector and suppressing the leaching of sulfur-based materials from the positive electrode to improve lifetime characteristics of the battery.

The binder according to the present invention comprises a copolymer having a first polymerization unit derived from a first monomer and a second polymerization unit derived from a second monomer. The polymerization unit of a copolymer is a portion constituting the copolymer and is distinguished depending on whether which of monomers before polymerization forms that portion. For example, the first polymerization unit derived from the first monomer means a portion that is present in the copolymer by using the first monomer during the polymerization of the copolymer. Particularly, since the addition polymerization using ethylene or a polymer thereof as a monomer has no structural change except that the double bond of ethylene is transformed into a single bond by polymerization, the polymerization units in the copolymer are easily distinguished.

The first monomer is an alkyl acrylate or alkyl methacrylate having at least one functional group, wherein the functional group is a functional group having a single or repeated structure of a hydroxy group, a thiol group, or an amino group substituted or unsubstituted with alkyl having 1 to 4 carbon atoms. The term "substituted with alkyl" means that one or more hydrogens of the hydroxy group, thiol group, and amino group are substituted with alkyl, and for example, a hydroxy group substituted with alkyl having 2 carbon atoms is an ethoxy group. The term "single structure" means a hydroxy group, a thiol group, or an amino group itself substituted or unsubstituted with alkyl having 1 to 4 carbon atoms, and the "repeated structure" means a structure formed by repeating a hydroxy group, a thiol group, or an amino group substituted or unsubstituted with alkyl having 1 to 4 carbon atoms at least two times. For example, the single structure of a hydroxy group substituted with alkyl having 2 carbon atoms is an ethoxy group, and the structure formed by repeating the hydroxy group substituted with alkyl having 2 carbon atoms twice is a 2-ethoxyethoxy group. Specifically, the functional group is selected from the group consisting of a hydroxy group, a thiol group, an amino group, a methoxy group, an ethoxy group, a propoxy group, a butoxy group, a methylthio group, an ethylthio group, a propylthio group, a butylthio group, a methylamino group, a dimethylamino group, an ethylamino group, a diethylamino group, a propylamino group, a dipropylamino group, a butylamino group, a dibutylamino group, a methoxymethoxy group, a 2-ethoxyethoxy group, a 3-propoxypropoxy group, and a 4-butoxybutoxy group. The functional group may be present at the end of the branch of the copolymer and the solubility of the copolymer in water or the solvent for the electrolyte may be controlled depending on the presence of the functional group. In addition, the functional group imparts functionality such as adsorption for the polysulfide to the binder. In the alkyl acrylate or alkyl methacrylate, the length of the branch of the copolymer is determined by the number of carbon atoms of the alkyl, and thus the position of the functional group can be changed. According to an embodiment of the present invention, the alkyl has 1 to 6 carbon atoms, preferably 2 to 4 carbon atoms. If the carbon number of the alkyl is more than 6, the proportion of the functional group in the copolymer is decreased, and the functionality obtained by adding the functional group to the binder is lowered. According to an embodiment of the present invention, the first monomer is selected from the group consisting of 2-hydroxyethyl (meth) acrylate, 3-hydroxypropyl (meth)acrylate, 4-hydroxybutyl (meth)acrylate, 2-methoxyethyl (meth)acrylate, 3-methoxypropyl (meth)acrylate, 4-methoxybutyl (meth)acrylate, 2-ethoxyethyl (meth)acrylate, 3-ethoxypropyl (meth)acrylate, 4-ethoxybutyl (meth)acrylate, 2-(2-ethoxyethoxy) ethyl acrylate, 2-(methylamino)ethyl (meth)acrylate, 3-(methylamino)propyl (meth)acrylate, 4-(methylamino)butyl (meth) acrylate, 2-(N,N-dimethylamino)ethyl (meth)acrylate, 3-(N, N-dimethylamino)propyl (meth)acrylate, and 4-(N,N-dimethylamino)butyl (meth)acrylate. The first monomer may preferably be 4-hydroxybutyl acrylate, ethoxyethoxyethyl acrylate or 2-(N,N-dimethylamino) ethyl methacrylate, more preferably 4-hydroxybutyl acrylate. The second monomer is acrylic acid or methacrylic acid. If alkyl acrylate or alkyl methacrylate other than acrylic acid or methacrylic acid is used as the second monomer, the water solubility of the binder is remarkably reduced and the desired effect of the present invention cannot be achieved.

The copolymer comprises 10 to 50% by weight, preferably 15 to 40% by weight, more preferably 20 to 30% by weight of the first polymerization unit. The first polymerization unit has at least one functional group in the alkyl acrylate or alkyl methacrylate structure as described above, thereby imparting functionality to the functional group. If the copolymer contains less than 10% by weight of the first polymerization unit, it is difficult to impart the above-described functionality to the binder. In addition, if the copolymer contains more than 50% by weight of the first polymerization unit, the content of the second polymerization unit is relatively lowered even if the above-described functionality can be imparted to the binder, and thus it is difficult to secure the functionality basically required for the binder by the second polymerization unit. In one embodiment, if the content of the first polymerization unit in the copolymer is less than 10% by weight or more than 50% by weight, the adhesive force cannot be achieved up to the level of the following examples, and particularly, if the content is more than 50% by weight, there is a limitation that the side reaction of the electrolyte accelerates and the charging/discharging cycle becomes short, while the number of hydroxy groups increases. The second polymerization unit is a portion of the copolymer except for the first polymerization unit, and the copolymer comprises at least 50% by weight of the second polymerization unit. If the copolymer contains the second polymerization unit in an amount of 50% by weight or more, since the binder does not deteriorate the functionality of each of the positive electrode active material and the electrically conductive material while having a strong interaction with the positive electrode active material and the electrically conductive material, the performance of the lithium-sulfur secondary battery can be improved.

The copolymer has a glass transition temperature of −50 to 150° C., preferably 30 to 120° C., more preferably 40 to 80° C. If the copolymer having the above-described glass transition temperature is used, it is possible to ensure a good adhesive property to the current collector, a good physical adsorption force of the electrode, and a resistance to the electrolyte.

The copolymer has a solubility in water of 10% by weight or more, preferably 10 to 70% by weight. Here, the solubility in water of 10% by weight (or 70% by weight) means that a maximum of 10 g (or 70 g) of the copolymer can be dissolved in 100 g of water. Since it is possible to induce uniform dispersion of carbon by using the binder comprising the copolymer having the above-described solubility during the preparation of the positive electrode together with water, and to efficiently remove moisture even at a low drying temperature and a short drying time in the drying step, the capacity of the electrode can be maintained without loss of the positive electrode active material. In addition, the copolymer has solubility in an ether-based solvent of 5% by weight or less, preferably 1% by weight or less, more preferably 0.001 to 1% by weight. Here, the solubility in the ether-based solvent of 0.001 wt. % (or 1 wt. %) means that a maximum of 0.001 g (or 1 g) of the copolymer can be dissolved in 100 g of the ether-based solvent. Since the ether-based solvent is mainly used as an electrolyte in a battery, the solubility in the ether-based solvent can be interpreted as solubility in an electrolyte solution. When the copolymer has a low solubility with respect to the electrolyte, the positive electrode active material layer prepared by using the binder containing the copolymer has excellent resistance to the electrolyte solution of the electrode, so that the battery can exhibit high cycle stability.

The copolymer has a weight average molecular weight of 50,000 to 5,000,000, preferably 500,000 to 4,000,000. The weight average molecular weight is a value converted by standard polystyrene measured by a gel permeation chromatograph (GPC). Unless otherwise defined herein, the weight average molecular weight for a particular compound means the value measured by the above method.

The binder comprising the copolymer has a particle diameter of 0.1 to 10 nm.

According to embodiments of the present invention, the copolymer may be a random copolymer. By preparing the copolymer as a random copolymer, functional groups present in different monomers can be efficiently dispersed in the copolymer.

The copolymer can be prepared in various ways. After blending the necessary monomers to conform to the above conditions, the mixture of monomers can be polymerized by solution polymerization, bulk polymerization, suspension polymerization, or emulsion polymerization to form the copolymer. According to one embodiment of the present invention, the polymerization method may be preferably the solution polymerization. The specific conditions for the solution polymerization are not particularly limited as long as they are conditions known in the art. However, the solvent for the solution polymerization may preferably be a solvent having a boiling point of 110 or less in order to use the polymer solution as it is without further purification after solution polymerization. The solvent may be selected from the group consisting of acetone, methanol, ethanol, acetonitrile, isopropanol, methyl ethyl ketone and water. According to one embodiment of the present invention, the solvent may preferably be water when considering the above-described boiling point and environmental effects.

The copolymer may be lithiated by adding a lithium-supplying material after polymerization. If the lithiated copolymer is used as a binder, the lithiated copolymer can be an additional source of lithium in the lithium-sulfur secondary battery, which can improve the performance of the lithium-sulfur secondary battery. The lithiation of the copolymer occurs mainly in the second polymerization unit due to the nature of the functional group constituting the copolymer. The hydrogen of the carboxyl group contained in the second polymerization unit is substituted with lithium by lithiation. If the binder containing a functional group in an acid form such as a carboxyl group is used, since the functional group may be substituted with lithium in the electrolyte to reduce the lithium ion concentration in the electrolyte and so on, and thus may play a negative role in the performance of the battery, it can be preferable that the functional group is maximally lithiated as much as possible. In addition, an electrode using a binder that is not lithiated has an acid-type functional group and thus can decompose the electrolyte solution and remaining water, thereby generating a gas inside the battery and expanding the battery.

During the lithiation reaction, the lithium-supplying material may be a basic material such as, for example, LiOH (or LiOH.$H_2$O). If the basic material is used, the lithiation reaction proceeds by the neutralization reaction. Since the neutralization reaction has a very high reactivity, almost all of the acidic functional groups can be lithiated even when the acidic functional group and the lithium-supplying material (basic material) are added in a molar ratio of 1:1. If an excessive amount of the lithium-supplying material is added relative to the molar number of acidic functional groups, an unreacted lithium-supplying material will be present and the unreacted lithium-supplying material may negatively affect the battery, and thus a separate process for removing the unreacted lithium-supplying material is required. If the performance of the cell is evaluated after preparing the electrode in the state where the unreacted lithium-supplying material is not removed, the results cause a large resistance when increasing the c-rate.

Positive Electrode Active Material Layer

The present invention provides a positive electrode active material layer formed from a composition comprising the above-described binder, a positive electrode active material, and an electrically conductive material.

The ratio of the binder in the composition may be selected in consideration of the desired performance of the battery. According to one embodiment of the present invention, the composition includes 0.001 to 10 parts by weight of the binder, based on 100 parts by weight of the solid content in the composition. The solid content in the composition as a basis of the content means a solid component in the composition except for the solvent and the monomer that can be contained in the binder and the like.

The ratio of the positive electrode active material in the composition may be selected in consideration of the desired performance of the battery. According to one embodiment of the present invention, the composition contains 25 to 95 parts by weight of the positive electrode active material, based on 100 parts by weight of the solid content in the composition. The positive electrode active material may be selected from elemental sulfur ($S_8$), a sulfur-carbon composite, a sulfur-based compound, or a mixture thereof, but is not limited thereto. Specifically, the sulfur-based compound may be $Li_2S_n(n \geq 1)$, an organic sulfur compound or a carbon-sulfur polymer (($C_2S_x)_n$: x=2.5~50, n≥12). They are applied in combination with electrically conductive material because these sulfur materials are not electrically conductive by itself.

In addition, the sulfur-carbon composite is one embodiment of a positive electrode active material in which carbon and sulfur are mixed to reduce the leaching of sulfur into the electrolyte and increase the electrical conductivity of the electrode containing sulfur.

The carbon material constituting the sulfur-carbon composite may be crystalline or amorphous carbon, and may be an electrically conductive carbon. Specifically, the carbon material may be any one selected from the group consisting of graphite, graphene, Super P, carbon black, Denka black, acetylene black, Ketjen black, channel black, furnace black, lamp black, thermal black, carbon fiber, carbon nanofiber, carbon nanotube, carbon nanowire, carbon nano ring, carbon fabric, and fullerene ($C_{60}$).

Such sulfur-carbon composite may include sulfur-carbon nanotube composites and the like. Specifically, the sulfur-carbon nanotube composite includes a carbon nanotube aggregate having a three-dimensional structure and sulfur or sulfur compounds provided on at least a part of an inner surface and outer surface of the carbon nanotube aggregate.

Since the sulfur-carbon nanotube composite according to one embodiment of the present invention contains sulfur existing inside the three-dimensional structure of the carbon nanotube, if the soluble polysulfide can be located inside the carbon nanotube even if the soluble polysulfide is generated by the electrochemical reaction, the collapse of structure of the positive electrode can be suppressed by keeping the entangled structure in three dimensions even when leaching the polysulfide. As a result, the lithium-sulfur secondary battery comprising the sulfur-carbon nanotube composite has an advantage that a high capacity can be implemented even at a high loading. Also, the sulfur or sulfur-based compounds may be comprised in the inner pores of the carbon nanotube aggregate.

The carbon nanotube refers to a linear electrically conductive carbon and specifically, the linear electrically conductive carbon may be carbon nanotube (CNT), graphitic nanofiber (GNF), carbon nanofiber (CNF), or activated carbon fiber (ACF). Both single-wall carbon nanotubes (SWCNT) and multi-wall carbon nanotubes (MWCNT) can be used.

According to one embodiment of the present invention, the sulfur-carbon composite is prepared by impregnating sulfur or sulfur-based compounds on the outer surface and inside of the carbon, and can optionally be subjected to a step of adjusting the diameter of carbon before, after, or both before and after the impregnating step. The impregnating step may be carried out by mixing carbon with a powder of sulfur or sulfur-based compounds and then heating to impregnate carbon with molten sulfur or sulfur-based compounds, and such mixing can be performed by a dry ball mill method, a dry jet mill method, or a dry dyno mill method.

The ratio of the electrically conductive material in the composition may be selected in consideration of the desired performance of the battery. According to one embodiment of the present invention, the composition comprises 2 to 70 parts by weight of the electrically conductive material, based on 100 parts by weight of the solid content in the composition. The electrically conductive material may be selected from graphite such as natural graphite or artificial graphite; carbon blacks such as carbon black, acetylene black, Ketjen black, channel black, furnace black, lamp black, or thermal black; electrically conductive fibers such as carbon fiber or metal fiber; carbon fluoride; metal powder such as aluminum or nickel powder; electrically conductive whisker such as zinc oxide or potassium titanate; electrically conductive metal oxides such as titanium oxide; or polyphenylene derivatives, but is not limited thereto.

The composition may further comprise other components, in addition to the binder, the positive electrode active material, and the electrically conductive material described above. Additional components to the composition may include cross-linking agents or dispersing agents for the electrically conductive materials. The cross-linking agent may be a cross-linking agent having two or more functional groups capable of reacting with the cross-linkable functional group of the polymer in order for the polymer of the binder to form a cross-linking network. The cross-linking agent may be selected from, but not limited to, an isocyanate cross-linking agent, an epoxy cross-linking agent, an aziridine cross-linking agent, or a metal chelate cross-linking agent. According to one embodiment of the present invention, the cross-linking agent may preferably be the isocyanate cross-linking agent. The cross-linking agent may be added to the composition in an amount of 0.0001 to 1 part by weight based on 100 parts by weight of the solid content in the composition.

The dispersing agent for the electrically conductive material helps the dispersion of the non-polar carbon based electrically conductive material and thus the formation of a paste. The dispersing agent for the electrically conductive material is not particularly limited, but may be selected from cellulose-based compounds including carboxymethyl cellulose (CMC), starch, hydroxypropyl cellulose, and regenerated cellulose. According to one embodiment of the present invention, the dispersing agent for the electrically conductive material may preferably be carboxymethyl cellulose (CMC). The dispersing agent for the electrically conductive material may be added in an amount of 0.1 to 20 parts by weight based on 100 parts by weight of the solid content in the composition.

In forming the composition, a solvent may be used. The type of the solvent can be appropriately set in consideration of the desired performance of the battery and the like. According to one embodiment of the present invention, the solvent may be selected from organic solvent such as N-methyl-2-pyrrolidone, propylene carbonate, ethylene carbonate, butylene carbonate, dimethyl carbonate, diethyl carbonate, gamma-butyrolactone, 1,2-dimethoxyethane, tetrahydrofuran, 2-methyltetrahydrofuran, dimethyl sulfoxide, formamide, dimethylformamide, acetonitrile, nitromethane, methyl formate, methyl acetate, triester phosphate, trimethoxymethane, sulfolane, methyl sulfolane, 1,3-dimethyl-2-imidazolidinone, propylene carbonate derivatives, tetrahydrofuran derivatives, methyl propionate or ethyl propionate, and water. Since the binder of the present invention has a solubility in water of 10% by weight or more, water is preferably used as a solvent in the present invention. When water is used as a solvent, it is advantageous in terms of drying temperature and environment.

The thickness of the active material layer formed by the composition may be suitably selected in consideration of the desired performance, and is not particularly limited. According to one embodiment of the present invention, the active material layer may preferably have a thickness of 1 to 200 μm.

Lithium-Sulfur Secondary Battery

The present invention provides a lithium-sulfur secondary battery having improved cycle performance by forming an active material layer on a current collector to prepare a positive electrode, and then adding components of a negative electrode, a separator, and an electrolyte solution.

The positive electrode constituting the lithium-sulfur secondary battery according to the present invention includes a positive electrode current collector and a positive electrode active material layer formed on the positive electrode current collector. The positive electrode active material layer is prepared according to the above description. The positive electrode current collector is not particularly limited as long as it is generally used in the preparation of a positive electrode. According to one embodiment of the present invention, the positive electrode current collector may be at least one material selected from stainless steel, nickel, titanium, sintered carbon, and aluminum, and if necessary, the surfaces of the above-described materials may be treated with carbon, nickel, titanium, or silver. According to one embodiment of the present invention, the positive electrode current collector may be formed in various forms such as film, sheet, foil, net, porous body, foam, or nonwoven fabric. The thickness of the positive electrode current collector is not particularly limited and may be set in a suitable range in consideration of the mechanical strength of the positive electrode, the productivity, and the capacity of the battery.

A method of forming the positive electrode active material layer on the current collector may be a known coating method and is not particularly limited. For example, the coating method may be a bar coating method, a screen coating method, a doctor blade method, a dipping method, a reverse roll method, a direct roll method, a gravure method, or an extrusion method. The amount of the positive electrode active material layer to be coated on the current collector is not particularly limited, and is adjusted in consideration of the thickness of the finally desired positive electrode active material layer. Also, before or after the process of forming the positive electrode active material layer, a known process required for the preparation of the positive electrode, for example, a rolling or drying process, can be performed.

The electrolyte solution constituting the lithium-sulfur secondary battery according to the present invention is not particularly limited as long as it is a non-aqueous solvent serving as a medium through which ions involved in the electrochemical reaction of the battery can move. According to one embodiment of the present invention, the solvent may be a carbonate-based solvent, an ester-based solvent, an ether-based solvent, a ketone-based solvent, an alcohol-based solvent, or an aprotic solvent. Examples of the carbonate-based solvent may specifically include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc. Examples of the ester-based solvent may specifically include methyl acetate, ethyl acetate, n-propyl acetate, 1,1-dimethyl ethyl acetate, methyl propionate, ethyl propionate, γ-butyrolactone, decanolide, valerolactone, mevalonolactone, carprolactone, etc. Examples of the ether-based solvent may specifically include diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, or polyethylene glycol dimethyl ether, etc. Examples of the ketone-based solvent may specifically include cyclohexanone, etc. Examples of the alcohol-based solvent may specifically include ethylalcohol, or isopropylalcohol, etc. Examples of the aprotic solvent may specifically include nitriles such as acetonitrile, amides such as dimethylformamide, dioxolanes such as 1,3-dioxolane (DOL), or sulfolane, etc. The non-aqueous organic solvents may be used alone or in combination of two or more. The mixing ratio when using in combination of two or more can be appropriately adjusted depending on the desired performance of the battery, and particularly, a mixed liquid of a 1:1 volume ratio of 1,3-dioxolane and dimethoxyethane may be preferable.

The negative electrode of the lithium-sulfur secondary battery according to the present invention includes a negative electrode current collector and a negative electrode active material layer formed on the negative electrode current collector.

The negative electrode active material layer includes a negative electrode active material, a binder, and an electrically conductive material. Examples of the negative electrode active material may be a material capable of reversibly intercalating or deintercalating lithium ion ($Li^+$), a material capable of reacting with lithium ion to reversibly form a lithium-containing compound, lithium metal or a lithium alloy. The material capable of reversibly intercalating or deintercalating lithium ion ($Li^+$) may be, for example, crystalline carbon, amorphous carbon or mixtures thereof. The material capable of reacting with lithium ion ($Li^+$) to reversibly form a lithium-containing compound may be, for example, tin oxide, titanium nitrate or silicon. The lithium alloy may be, for example, an alloy of lithium (Li) and the metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The binder is not limited to the above-described binders, and can be any binder that can be used as a binder in the art.

The constitution of the current collector and the like, except for the negative electrode active material and the electrically conductive material, can be performed by the materials and methods used in the above-described positive electrode.

The separator for the lithium-sulfur secondary battery according to the present invention is a physical separator having a function of physically separating electrodes. The separator can be used without special restrictions, as long as it is used as a conventional separator. Particularly, a separator with excellent electrolyte solution humidification ability while exhibiting low resistance to ion migration of electrolyte solution is preferable.

In addition, the separator enables the lithium ion to be transported between the positive electrode and the negative electrode while separating or insulating the positive electrode and the negative electrode from each other. Such separator may be made of a porous, nonconductive, or insulating material having a porosity of 30 to 50%.

Specifically, a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, etc. may be used, and a nonwoven fabric made of glass fiber having high melting point or the like can be used. Among them, the porous polymer film is preferably used.

If the polymer film is used for both the buffer layer and the separator, the impregnation amount and ion conduction characteristics of the electrolyte solution are decreased and the effect of reducing the overvoltage and improving the capacity characteristics becomes insignificant. On the contrary, if the nonwoven fabric material is used for both the buffer layer and the separator, a mechanical strength cannot be ensured and thus a problem of short circuit of the battery occurs. However, if a film-type separator and a polymer nonwoven fabric buffer layer are used together, the mechanical strength can also be ensured together with the improvement effect of the battery performance due to the adoption of the buffer layer.

According to one preferred embodiment of the present invention, the ethylene homopolymer (polyethylene) polymer film is used as a separator, and the polyimide nonwoven fabric is used as a buffer layer. In that case, the polyethylene polymer film preferably has a thickness of 10 to 25 μm and a porosity of 40 to 50%.

Hereinafter, examples of the present invention will be described in order to facilitate understanding of the present invention. However, the following examples are provided to facilitate understanding of the present invention, but the present invention is not limited thereto.

EXAMPLES

1. Preparation of Binder

Preparation Example 1

To a 100 mL round-bottom flask, 2.89 g of acrylic acid (AA), 0.72 g of 4-hydroxybutyl acrylate (HBA), and 32.50 g of water were charged and the inlet was sealed. Oxygen was removed via nitrogen bubbling for 30 minutes and the flask was immersed in an oil bath heated to 60° C., and then 4.00 mg of sodium persulfate and 1.18 mg of 2-mercapto ethanol were added to initiate the reaction. After 24 hours, the reaction was terminated and an acrylic copolymer was obtained (conversion rate: 99%, weight average molecular weight (Mw): 3,140,000).

Preparation Examples 2 to 5

A copolymer was prepared by the same method as Preparation Example 1, except that the kind and ratio of the monomers used in the polymerization were controlled as shown in Table 1 below.

TABLE 1

| | | Preparation Example 1 | Preparation Example 2 | Preparation Example 3 | Preparation Example 4 | Preparation Example 5 |
|---|---|---|---|---|---|---|
| First monomer (wt. %) | HBA[1] | 20 | 40 | 20 | — | — |
| | EOEOA[2] | — | — | — | 20 | — |
| | DMAEA[3] | — | — | — | — | 20 |
| Second monomer (wt. %) | MAA[4] | — | — | 80 | — | — |
| | AA[5] | 80 | 60 | — | 80 | 80 |
| Conversion rate (%) | | 99 | 99 | 99 | 99 | 99 |
| Mw/10³ | | 3140 | 1900 | 700 | 1600 | 900 |
| Glass transition temperature(° C.) | | 47 | 32 | 50 | 43 | 61 |

[1]HBA: 4-Hydroxybutyl acrylate
[2]EOEOA: 2-(2-Ethoxyethoxy) ethyl acrylate
[3]DMAEMA: 2-(N,N-dimethylamino)ethyl methacrylate
[4]MAA: Methacrylic acid
[5]AA: Acrylic acid Comparative Preparation Example 1

Polyvinylidene difluoride (PVDF) having a molecular weight of 530,000 was purchased from Sigma-Aldrich company and used it.

Comparative Preparation Example 2

Polyacrylic acid having a molecular weight of 1,250,000 was purchased from Sigma-Aldrich company and used it.

2. Evaluation of Performance of Binder (1) Experimental Method

Measurement Method of Solubility 1 g of the solute (monomer or polymer) was charged into 5 g of a solvent (water or electrolyte), and stirred at room temperature (25° C.) for 30 minutes, and then the undissolved residual solute was removed. The amount of the solute dissolved in the solvent was measured by measuring the amount of the residual solute removed, and converted the measured amount into a value for 100 g of the solvent to measure the solubility.

Measurement Method of Conversion Rate of Polymer

The reactants were diluted with a solvent to a concentration of 20 mg/mL and 5 mg/mL of acetone was added as a standard material, followed by performed the gas chromatography (PerkinElmer). Conversion rate was calculated from the change of the ratio of the size of the monomer peak relative to the area of the acetone peak.

<Analysis Condition>
  Solvent: water
  Initial temperature: 3 min at 50° C., Ramp: rising to 200° C. at 30° C./min
  Injection volume: 0.5 µL <Calculation of Conversion Rate>

$$\text{Conversion rate (\%)} = (A_{ini} - A_{fin})/A_{ini} \times 100$$

$A_{ini}$: relative ratio of the area of the monomer peak relative to the acetone peak at the initiation of the reaction $A_{fin}$: relative ratio of the area of the monomer peak relative to the acetone peak at the termination of the reaction Measurement Method of Molecular Weight of Polymer The weight average molecular weight (Mw) and the molecular weight distribution (PDI) were measured using GPC under the following conditions, and the measurement results were converted by using standard polystyrene from Agilent system in the construction of the calibration curve.

<Measurement Condition>
  Measuring instrument: Agilent GPC (Agilent 1200 series, U.S.)
  Column: series connection of PLGel-M and PLGel-L
  Column temperature: 40° C.
  Eluent: N,N-dimethylformaldehyde
  Flow rate: 1.0 mL/min
  Concentration: ~1 mg/mL (100 µL injection)

Preparation of Positive Electrode

A mixture having a weight ratio of carbon powder:sulfur of 30:70 was melt-diffused to obtain a carbon-sulfur composite. The positive electrode mixture (88.0% by weight of the carbon-sulfur composite, 7.0% by weight of the vapor grown carbon fiber (VGCF electrically conductive material), 5.0% by weight of the binder) was added to water as a solvent to prepare a positive electrode slurry, and then the prepared slurry was coated on an aluminum current collector with a thickness of 20 µm, dried at 50° C. for a minimum of 2 hours and then further dried at 80° C. for 12 hours to obtain a positive electrode having a loading amount of 5.5 mAh/cm². If the solvent was N-methylpyrrolidone, it was dried at 80° C. for 24 hours to prepare a positive electrode having a loading amount of 5.0 mAh/cm².

Measurement Method of Adhesive Force

The prepared positive electrode was prepared by punching it in a size of 2 cm×12 cm. A double-sided tape was attached on a glass slide glass, and the back side of the 3M tape was attached thereon, so that the adhesive side faces upward. The surface of the positive electrode active material layer prepared above was attached onto the adhesive surface to prepare a measurement sample. One end of the negative electrode attached to the glass was pulled and peeled by about 0.5 cm, and held to the clamp at the bottom of a Texture analyzer and the other hanging part of the positive electrode was held to the upper clamp and pulled with a force of 2 gf to measure the force at which the negative electrode slurry falls from the current collector.

Manufacture of Battery

For construction of a battery, the above-described positive electrode, a lithium foil having a thickness of 45 µm, and a polyolefin membrane (CelgardR 2400) as a separator were used. An electrolyte solution prepared by dissolving 0.38M of $LiN(CF_3SO_2)_2$ and 0.31M of $LiNO_3$ in a mixed solution of 1,3-dioxolane and dimethoxyethane was used as the electrolytic solution, thereby completing the preparation of the battery.

Evaluation Method of Cycle Characteristics
  Instrument: charging/discharging unit of 100 mA grade
  Charging: 0.3 C, constant current/constant voltage mode
  Discharging: 0.5 C, constant current mode, 1.8V
  Cycle temperature: 25° C.

(2) Evaluation of Binder

Example 1: Evaluation of Binder According to Preparation Example 1

A positive electrode was prepared using the binder prepared according to Preparation Example 1, and a battery comprising the positive electrode, a negative electrode, a separator, and an electrolyte was prepared according to the above-described description. The adhesive force and the like were measured during the manufacturing process of the battery. The results are shown in Table 2 below.

Examples 2 to 5: Evaluation of Binder According to Preparation Examples 2 to 5

The adhesive force and the like were measured in the same manner as in Example 1, except that a positive electrode was prepared using the binder prepared according to Preparation Examples 2 to 5. The results are shown in Table 2 below.

Comparative Examples 1 and 2: Evaluation of Binder According to Comparative Preparation Examples 1 and 2

The adhesive force and the like were measured in the same manner as in Example 1, except that a positive electrode was prepared using the binder prepared according to Comparative Preparation Examples 1 and 2. The results are shown in Table 2 below.

having a low glass transition temperature in the binder, the flexibility of the electrode is improved and the adhesive force of the electrode is increased, which can lead to improvement of the processability and improvement of the performance of the battery.

(3) Evaluation of Performance of Battery to which the Binder is Applied

The batteries according to Example 1 and Comparative Example 1 were evaluated for 150 cycles between 1.5 V and 2.8 V in the order of 2.5 cycles of 0.1 C discharging/charging, 3 cycles of 0.2 C charging/discharging, and 0.3 C charging/0.5 C discharging, and the capacity retention rate was measured by calculating the remaining capacity in the $7^{th}$ cycle and the remaining capacity in the $125^{th}$ cycle relative to the initial capacity. The results are shown in Table 3 below.

TABLE 3

|  | Remaining capacity at the $7^{th}$ cycle (mAh/g) | Remaining capacity at the $125^{th}$ cycle (mAh/g) | capacity retention rate (%) |
|---|---|---|---|
| Example 1 | 780 | 718 | 92 |
| Comparative Example 1 | 787 | 692 | 88 |

According to Table 3 above, it can be confirmed that the battery using the binder (Preparation Example 1) according to the present invention has improved lifetime characteristics of the battery as compared to the battery using the binder (Comparative Preparation Example 1) known in the art. It is considered that this is because the binder according to the present invention not only has an effect of improving the stability of the electrode due to the improvement of the adhesive force, but also strongly interacts with the polysulfide to chemically further inhibit the leaching of the positive electrode active material.

TABLE 2

|  | Example 1 | Example 2 | Example 3 | Example 4 | Example 5 | Comparative Example 1 | Comparative Example 2 |
|---|---|---|---|---|---|---|---|
| Binder solvent | water | water | water | water | water | NMP | water |
| Solubility in electrolyte (wt. %) | <0.1 | <0.1 | <0.1 | 0.2 | 0.2 | >10 | <0.1 |
| Adhesive force (gf/cm) | 9.8 | 6.5 | 8.1 | 8.9 | 7.6 | 4.9 | 1.5 |
| State of electrode[1] | ○ | ○ | Δ | ○ | ○ | Δ | X |

[1]State of electrode: uniform electrode surface (○), uniform but curled electrode surface (Δ), occurrence of electrode detaching (X)

According to Table 2, it was confirmed that the use of the binder according to the present invention improves the adhesive force to the current collector as compared with the case of using the binder of Comparative Example. It is considered that this is because the copolymer comprised in the binder according to the Example of the present invention is physically and chemically combined with components in the electrode active material layer and thus it is possible to form a stable electrode having high resistance to the electrolyte solution. Additionally, by introducing a monomer (4) Evaluation of Performance of Battery to which the Lithiated Binder is Applied After 100% lithiation carboxylic acids in the binder according to Example 1, the obtained binder was applied to the battery and the performance of the battery was evaluated. To evaluate the performance of the battery, The battery was evaluated for 150 cycles between 1.5 V and 2.8 V in the order of 2.5 cycles of 0.1 C discharging/charging, 3 cycles of 0.2 C charging/discharging, and 0.3 C charging/0.5 C discharging, and the capacity retention rate was measured by calculating the remaining capacity at the 7$^{th}$ cycle and the remaining capacity at the 125$^{th}$ cycle relative to the initial capacity.

As a result, it was confirmed that the remaining capacity in the 7$^{th}$ cycle is 775 mAhg$^{-1}$, and the remaining capacity in the 125$^{th}$ cycle is 736 mAhg$^{-1}$, and through this, the calculated capacity retention rate was 95%. According to the experimental results, it can be confirmed that when the carboxylic acids in the binder are 100% lithiated, the lifetime of the battery is significantly improved. This is considered to be a result of minimizing side effects such as reaction with the electrolytic solution of the carboxylic acid functional group by lithiation and increasing the supply of lithium in the battery system.

It is intended that all simple variations or modifications of the present invention are within the scope of the present invention, and the scope of protection of the present invention will be apparent from the appended claims.

The invention claimed is:

1. A composition for preparing a positive electrode active material layer of a lithium-sulfur secondary battery comprising a binder, a positive electrode active material and an electrically conductive material, wherein the binder comprises:
   a copolymer comprising a first polymerization unit derived from a first monomer and a second polymerization unit derived from a second monomer,
   wherein the first monomer is alkyl acrylate having at least one functional group or alkyl methacrylate having at least one functional group,
   the second monomer is acrylic acid or methacrylic acid, and
   the functional group is selected from the group consisting of a methylamino group, a dimethylamino group, an ethylamino group, a diethylamino group, a propylamino group, a dipropylamino group, a butylamino group and a dibutylamino group, the copolymer comprises 10% by weight to 50% by weight of the first polymerization unit,
   the copolymer comprises 50% by weight to 90% by weight of the second polymerization unit,
   the copolymer has weight average molecular weight of 500,000 to 4,000,000,
   the positive electrode active material comprises sulfur-carbon composite,
   the copolymer has a solubility in water of 10% by weight to 70% by weight and a solubility in an ether-based solvent of 0.001% by weight to 1% by weight, and
   the binder is in the form of particles having a particle diameter of 0.1 nm or more and less than 10 nm.

2. The binder for the lithium-sulfur secondary battery composition according to claim 1, wherein the second polymerization unit has a form in which hydrogen of a carboxyl group is substituted with lithium.

3. The composition according to claim 1, wherein the alkyl in the alkyl acrylate or alkyl methacrylate has 1 to 6 carbon atoms.

4. The composition according to claim 1, wherein the copolymer has a glass transition temperature of 30° C. to 120° C.

5. The composition for preparing the positive electrode active material layer of the lithium-sulfur secondary battery according to claim 1, wherein the composition comprises,
   0.001 parts by weight to 10 parts by weight of the binder;
   25 parts by weight to 95 parts by weight of the positive electrode active material; and 2 parts by weight to 70 parts by weight of the electrically conductive material,
   based on 100 parts by weight of a solid content in the composition.

6. The composition for preparing the positive electrode active material layer of the lithium-sulfur secondary battery according to claim 5, wherein the composition further comprises:
   0.1 parts by weight to 20 parts by weight of a dispersing agent for the electrically conductive material,
   based on 100 parts by weight of the solid content in the composition.

7. A positive electrode for a lithium-sulfur secondary battery comprising:
   a current collector; and
   a positive electrode active material layer comprising the composition according to claim 1 on the current collector.

8. A lithium-sulfur secondary battery comprising the positive electrode according to claim 7.

* * * * *